(12) United States Patent
Ruh et al.

(10) Patent No.: US 10,533,879 B2
(45) Date of Patent: Jan. 14, 2020

(54) OPTICAL ENCODER WITH AXIALLY ALIGNED SENSOR

(71) Applicant: Apple Inc., Cupertino, CA (US)

(72) Inventors: Richard Ruh, Monte Sereno, CA (US); Prashanth S. Holenarsipur, Fremont, CA (US); Serhan O. Isikman, Sunnyvale, CA (US); Anant Rai, San Jose, CA (US)

(73) Assignee: Apple Inc., Cupertino, CA (US)

( * ) Notice: Subject to any disclaimer, the term of this patent is extended or adjusted under 35 U.S.C. 154(b) by 248 days.

(21) Appl. No.: 15/729,499

(22) Filed: Oct. 10, 2017

(65) Prior Publication Data

US 2018/0031395 A1 Feb. 1, 2018

Related U.S. Application Data

(63) Continuation of application No. 14/333,418, filed on Jul. 16, 2014, now Pat. No. 9,797,752.

(51) Int. Cl.
*G01D 5/34* (2006.01)
*G01D 5/347* (2006.01)
(52) U.S. Cl.
CPC .................. *G01D 5/3473* (2013.01)
(58) Field of Classification Search
CPC .......................... G01D 5/347; G01D 5/3473
USPC ............ 250/231.13, 231.14, 231.16, 231.18; 341/11, 13
See application file for complete search history.

(56) References Cited

U.S. PATENT DOCUMENTS

| | | |
|---|---|---|
| 3,056,030 A | 9/1962 | Kelchner |
| 4,133,404 A | 1/1979 | Griffin |
| 4,289,400 A | 9/1981 | Kubola et al. |
| 4,311,990 A | 1/1982 | Burke |
| 4,417,824 A | 11/1983 | Paterson et al. |
| 4,593,194 A | 6/1986 | Graham et al. |
| 4,617,461 A | 10/1986 | Subbarao et al. |
| 4,641,026 A | 2/1987 | Garcia, Jr. |
| 4,670,737 A | 6/1987 | Rilling |
| 4,884,073 A | 11/1989 | Souloumiac |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,034,602 A | 7/1991 | Garcia et al. |
| 5,214,278 A | 5/1993 | Banda |
| 5,288,993 A | 2/1994 | Bidiville et al. |

(Continued)

OTHER PUBLICATIONS

U.S. Appl. No. 61/645,033, filed May 9, 2012, 84 pages.

(Continued)

*Primary Examiner* — Kevin K Pyo
(74) *Attorney, Agent, or Firm* — Brownstein Hyatt Farber Schreck, LLP

(57) ABSTRACT

Embodiments of the present disclosure provide an optical encoder for an electronic device. The optical encoder comprises an elongated shaft and a plurality of markings axially disposed around a circumference of the elongated shaft. The optical encoder also includes an optical sensor. In embodiments, the optical sensor includes an emitter and an array of photodiodes. The emitter and the array of photodiodes may be radially aligned with respect to the elongated shaft or axially aligned with respect to the shaft.

19 Claims, 7 Drawing Sheets

(56) References Cited

U.S. PATENT DOCUMENTS

| | | |
|---|---|---|
| 5,471,054 A | 11/1995 | Watanabe |
| 5,572,314 A | 11/1996 | Hyman et al. |
| 5,748,111 A | 5/1998 | Bates |
| 5,841,050 A | 11/1998 | Clift et al. |
| 5,847,335 A | 12/1998 | Sugahara et al. |
| 5,943,233 A | 8/1999 | Ebina |
| 5,963,332 A | 10/1999 | Feldman et al. |
| 6,175,679 B1 | 1/2001 | Veligdan et al. |
| 6,246,050 B1 | 6/2001 | Tullis et al. |
| 6,809,275 B1 | 10/2004 | Cheng et al. |
| 6,985,107 B2 | 1/2006 | Anson |
| 7,102,626 B2 | 9/2006 | Denny, III |
| 7,135,673 B2 | 11/2006 | Saint Clair |
| 7,265,336 B2 | 9/2007 | Hataguchi et al. |
| 7,345,513 B2 | 3/2008 | Gropper et al. |
| 7,528,824 B2 | 5/2009 | Kong |
| 7,761,246 B2 | 7/2010 | Matsui |
| 7,781,726 B2 | 8/2010 | Matsui et al. |
| 7,865,324 B2 | 1/2011 | Lindberg |
| 7,999,199 B2 | 8/2011 | Villain |
| 8,138,488 B2 | 3/2012 | Grot |
| 8,368,677 B2 | 2/2013 | Yamamoto |
| 8,373,661 B2 | 2/2013 | Lan et al. |
| 8,441,450 B2 | 5/2013 | Degner et al. |
| 8,477,118 B2 | 7/2013 | Lan et al. |
| 8,487,237 B2 | 7/2013 | Watanabe |
| 8,525,777 B2 | 9/2013 | Stavely et al. |
| 8,593,598 B2 | 11/2013 | Chen et al. |
| 8,666,682 B2 | 3/2014 | Lavigne et al. |
| 8,704,787 B2 | 4/2014 | Yamamoto |
| 8,711,093 B2 | 4/2014 | Ong et al. |
| 8,730,167 B2 | 5/2014 | Ming et al. |
| 8,743,088 B2 | 6/2014 | Watanabe |
| 8,859,971 B2 | 10/2014 | Weber |
| 8,890,045 B2 | 11/2014 | Toh et al. |
| 8,895,911 B2 | 11/2014 | Takahashi |
| 8,922,399 B2 | 12/2014 | Bajaj et al. |
| 8,994,694 B2 | 3/2015 | Lee et al. |
| 9,041,663 B2 | 5/2015 | Westerman |
| 9,086,738 B2 | 7/2015 | Leung et al. |
| 9,134,145 B2 | 9/2015 | Shimizu |
| 9,176,598 B2 | 11/2015 | Sweetser et al. |
| 9,285,926 B2 | 3/2016 | Yang et al. |
| 9,542,016 B2 | 1/2017 | Armstrong-Muntner |
| 9,797,752 B1 | 10/2017 | Ruh et al. |
| 9,797,753 B1 | 10/2017 | Gowreesunker et al. |
| 10,190,891 B1 | 1/2019 | Rothkopf et al. |
| 2005/0075558 A1 | 4/2005 | Vecerina et al. |
| 2006/0250377 A1 | 11/2006 | Zadesky et al. |
| 2007/0146348 A1 | 6/2007 | Villain |
| 2007/0222756 A1 | 9/2007 | Wu et al. |
| 2008/0130914 A1 | 6/2008 | Cho |
| 2009/0073119 A1 | 3/2009 | Le et al. |
| 2009/0152452 A1 | 6/2009 | Lee et al. |
| 2010/0149099 A1 | 6/2010 | Elias |
| 2012/0113044 A1 | 5/2012 | Strazisar et al. |
| 2014/0132516 A1 | 5/2014 | Tsai et al. |
| 2014/0327630 A1 | 11/2014 | Burr et al. |
| 2015/0051671 A1 | 2/2015 | Browne et al. |
| 2016/0061636 A1 | 3/2016 | Gowreesunker et al. |
| 2016/0306437 A1 | 10/2016 | Zhang et al. |
| 2017/0115757 A1 | 4/2017 | Armstrong-Muntner |
| 2017/0248446 A1* | 8/2017 | Gowreesunker ..... G01D 5/3473 |

OTHER PUBLICATIONS

DeskThorityNet, Optical Switch Keyboards, http://deskthority.net/keyboards-f2/optical-switch-keyboards-t1474.html, Jul. 11, 2015, 22 pages.

Epstein et al., "Economical, High-Performance Optical Encoders," Hewlett-Packard Journal Oct. 1988, pp. 99-106 [text only version].

Epstein et al., "Economical, High-Performance Optical Encoders," Hewlett-Packard Journal Oct. 1988, pp. 99-106.

Krishnan et al., "A Miniature Surface Mount Reflective Optical Shaft Encoder," Hewlett-Packard Journal, Dec. 1996, Article 8, pp. 1-6.

* cited by examiner

OPTICAL ENCODER WITH AXIALLY ALIGNED SENSOR

CROSS-REFERENCE TO RELATED APPLICATIONS

This application is a continuation of U.S. Nonprovisional patent application Ser. No. 14/333,418, filed Jul. 16, 2014, the disclosures of which are hereby incorporated herein by reference in their entirety.

TECHNICAL FIELD

The present disclosure is directed to optical encoders for electronic devices. Specifically, the present disclosure is directed to an optical encoder in which markings of an encoding pattern of the optical encoder has an axial component disposed around a circumference of the shaft of the optical encoder. In addition, a light source and a photodiode array are axially or radially aligned with respect to the optical encoder so as to detect the rotational or linear movement of the shaft of the optical encoder.

BACKGROUND

Many devices, including mechanical, electronic and computerized devices, may utilize various types of encoders for obtaining and collecting data about the particular device. For example, a rotary encoder may be used to collect information about a position of a component in the device, a direction in which the component is moving, and/or a speed of the movement of the component. However, some of these encoders are not suitable for use in a small or compact space that may be required for an electronic device having a small form factor.

It is with respect to these and other general considerations that embodiments have been made. Also, although relatively specific problems have been discussed, it should be understood that the embodiments should not be limited to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Embodiments of the present disclosure provide an optical encoder for an electronic device. The optical encoder comprises an elongated shaft having an axial component. The axial component may consist of a plurality of stripes or markings that are axially disposed around a circumference of the elongated shaft. The optical encoder also includes an optical sensor. In embodiments, the optical sensor includes an emitter and a photodiode array. The emitter and the photodiode array may be radially aligned with respect to the elongated shaft or axially aligned with respect to the elongated shaft.

In another embodiment, an electronic device is provided. The electronic device includes a processor, a memory and an optical encoder. The optical encoder comprises an elongated shaft having a plurality of markings axially disposed around a circumference. The optical encoder may also include a light source and a photodiode array. The light source and the photodiode array may be radially aligned with respect to the elongated shaft or axially aligned with respect to the elongated shaft.

In another embodiment of the present disclosure, a method for detecting rotational movement of a shaft contained within a housing of an electronic device is disclosed. In these embodiments, a light source is configured to emanate light on the shaft. The shaft includes a plurality of markings or stripes that are axially disposed around a circumference of the shaft. The markings or stripes disposed on the shaft are configured to reflect the light into a plurality of photodiodes. When the reflected light is received by the plurality of photodiodes, rotational movement and directional movement of the shaft may be determined.

DETAILED DESCRIPTION

Various embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope of the embodiments to those skilled in the art. The following detailed description is, therefore, not to be taken in a limiting sense.

In various electronic devices, rotational movement of a component of the electronic device may need to be determined. In such instances an optical encoder may be used to detect the rotational movement. More specifically, embodiments of the present disclosure use an optical encoder to detect rotational movement, rotational direction and/or rotational speed of a component of the electronic device. Once the rotational movement, rotational direction and/or rotational speed have been determined, this information may be used to output or change information and images that are presented on a display or user interface of the electronic device.

As will be explained below, the optical encoder of the present disclosure includes a light source, a photodiode array, and a shaft. However, unlike typical optical encoders, the optical encoder of the present disclosure utilizes an encoding pattern disposed directly on the shaft. For example, the encoding pattern includes a number of light and dark markings or stripes that are axially disposed along the shaft. Each stripe or combination of stripes on the shaft may be used to identify a position of the shaft.

For example, as light is emitted from the light source and reflected off of the shaft into the photodiode array, a position, rotation, rotation direction and rotation speed of the shaft may be determined. Once the rotation direction and speed are determined, this information may be used to output or change information or images that are presented on the display or user interface of the electronic device.

In other embodiments, the shape or form of the shaft of the encoder may be used to determine a position, rotation, rotation direction and rotation speed of the shaft. For example, the shaft may be fluted or have a number of channels that cause the light to be reflected in a number of different directions. Accordingly, a diffractive pattern may be used to determine the rotation, rotation direction and rotation speed of the shaft.

Figure 1A:
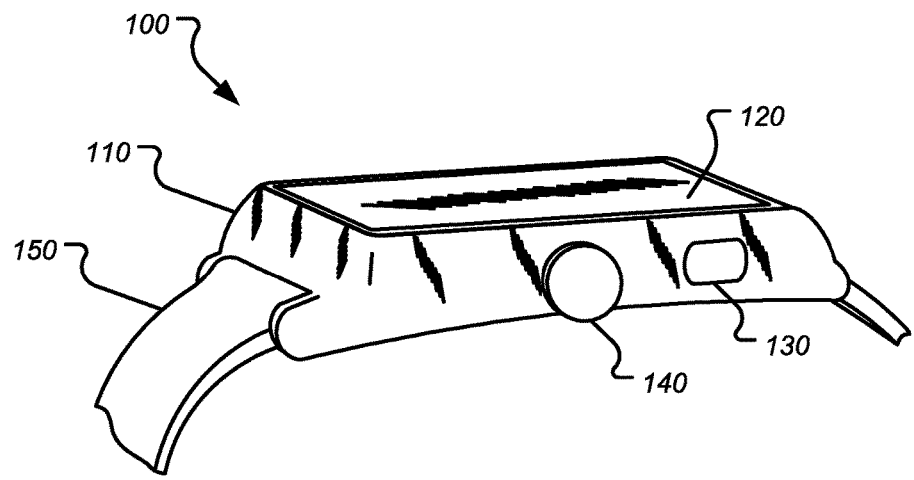
FIG. 1A illustrates an exemplary electronic device according to one or more embodiments of the present disclosure.

FIG. 1A illustrates an exemplary electronic device 100 according to one or more embodiments of the present disclosure. In certain embodiments, the electronic device 100 may be a portable computing device. Such examples include cell phones, smart phones, tablet computers, laptop computers, time-keeping devices, computerized glasses and other wearable devices navigation devices, sports devices, accessory devices, health-monitoring devices, medical devices and the like. In one example and as shown in FIG. 1, the electronic device 100 may be a wearable electronic device. The electronic device 100 may include a housing 110 as well as a display 120, a button 130 (or other input mechanism) and a crown 140.

In many examples, the wearable device, such as is depicted in FIG. 1A, may include a processor coupled with or in communication with a memory, one or more communication interfaces, output devices such as displays and speakers, and one or more additional input devices such as buttons, dials, microphones, or touch-based interfaces. The communication interface(s) can provide electronic communications between the communications device and any external communication network, device or platform, such as but not limited to wireless interfaces, Bluetooth interfaces, Near Field Communication interfaces, infrared interfaces, USB interfaces, Wi-Fi interfaces, TCP/IP interfaces, network communications interfaces, or any conventional communication interfaces. The wearable electronic device 100 may provide information regarding time, health, statuses or externally connected or communicating devices and/or software executing on such devices, messages, video, operating commands, and so forth (and may receive any of the foregoing from an external device), in addition to communications.

In embodiments, the display 120 of the electronic device 100 may be a touch-sensitive display having an input area. The input area may cover the entire display 120 or substantially all of the display 120. In another embodiment, the input area may cover only a portion of the display 120.

The display 120 is configured to output a user interface that displays information about the electronic device 100 as well as other information that is stored in a memory of the electronic device 100. For example, the user interface may present information corresponding to one or more applications that are being executed on the electronic device 100. Such applications may include a time keeping application, an email application, a phone application, a calendaring application, a game application and the like.

In embodiments, the button 130 or the crown 140 may be used to select, adjust or change various images that are output on the display 120. For example, if the display 120 of the electronic device 100 is displaying a time keeping application, the crown 140 may be rotated in either direction to change or adjust the position of the hands or the digits that are displayed for the time keeping application. In other embodiments, the crown 140 may be rotated to move a cursor or other type of selection mechanism from a first displayed location to a second displayed location in order to select an icon or move the selection mechanism between various icons that are output on the display 120. Likewise, the crown may be pushed or pressed to provide another input to the device 100.

Although not shown in FIG. 1A, the electronic device 100 may also include various additional components that assist in the overall operation of the device. For example, the electronic device 100 may include a sensor, a microphone, a processor, a memory, and the like. Further, the crown 140 and the button 130 may interact with one or more of the components listed to facilitate operation of the electronic device 100.

The electronic device 100 may also include a band 150 that may be used to secure or attach the electronic device 100 to a user. Other attachment mechanisms, such as, for example, a strap, a lanyard or other such attachment mechanism may also be used.

In certain embodiments, electronic device 100 may also include a keyboard or other input mechanism. Additionally, the electronic device 100 may include one or more components that enable the electronic device 100 to connect to the Internet and/or access one or more remote databases or storage devices. The electronic device 100 may also enable communication over wireless media such as acoustic, radio frequency (RF), infrared, and other wireless media mediums. Such communication channels may enable the electronic device 100 to remotely connect and communicate with one or more additional devices such as, for example, a laptop computer, tablet computer, mobile telephone, personal digital assistant, portable music player, speakers and/or headphones and the like.

Figure 1B:
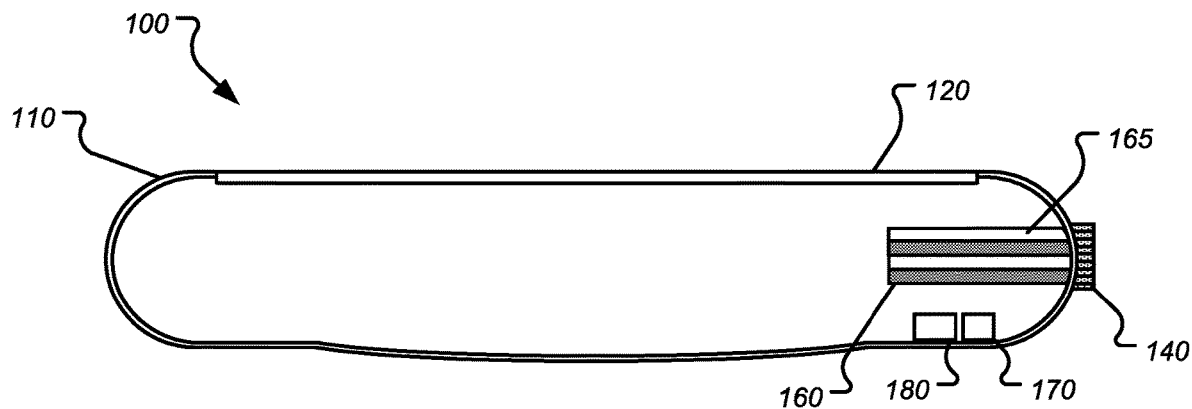
FIG. 1B illustrates a cross-sectional view of the electronic device of FIG. 1A according to one or more embodiments of the present disclosure.

FIG. 1B illustrates a cross-sectional view of the electronic device 100 of FIG. 1A according to one or more embodiments of the present disclosure. As shown in FIG. 1B, the electronic device 100 includes an optical encoder that consists of a shaft 160, a light source 170 and a photodiode array 180. Although a photodiode array is specifically mentioned, embodiments disclosed herein may use various types of sensors that are arranged in various configurations for detecting the movement described herein. For example, the movement of the shaft 160 may be detected by an image sensor, a light sensor such as a CMOS light sensor or imager, a photovoltaic cell or system, photo resistive component, a laser scanner and the like.

In embodiments, and as will be discussed below, the optical encoder is used to determine positional data of the crown 140. More specifically, the optical encoder may be used to detect that movement of the crown 140 including the direction of the movement, speed of the movement and so on. The movement may be rotational movement, translational movement, angular movement and so on. The optical encoder may also be used to detect the degree of the change of rotation of the crown 140 and/or the angle of rotation of the crown 140 as well as the speed and the direction of the rotation of the crown 140. Once the movement data of the crown 140 is determined, one or more graphics, images or icons on the display 120 of the electronic device 100 may be updated or altered accordingly.

For example, continuing with the time keeping application example discussed above, the crown 140 may be rotated in a clockwise manner in order to change the displayed time. The optical encoder of the present disclosure will detect the original starting position of the crown 140, the rotational movement of the crown 140 in the clockwise direction, and will also detect the speed at which the crown 140 is being rotated. As a result, the displayed hands of the time keeping application may rotate or otherwise move in a similar direction and speed.

Referring back to FIG. 1B, the optical encoder may include a shaft 160. The shaft 160 may be coupled to the crown 140. In another embodiment the shaft 160 may be an extension of the crown 140. That is, the crown 140 and the shaft 160 may be manufactured from a single piece. As the shaft 160 is coupled to, or is otherwise a part of the crown 140, as the crown 140 rotates or moves in a particular direction and at a particular speed, the shaft 160 also rotates or moves in the same direction and with the same speed.

The shaft 160 of the optical encoder includes an encoding pattern 165. As discussed, the encoding pattern 165 is used to determine positional information about the shaft 160 including rotational movement, angular displacement and movement speed. The encoding pattern 165 may include a plurality of light and dark stripes such as shown in FIG. 1B.

Although light stripes and dark stripes are specifically mentioned and shown, the encoding pattern may consist of various types of stripes having various shades or colors that provide surface contrasts. For example, the encoding pattern may include a stripe or marking that has a high reflective surface and another stripe that has a low reflective surface regardless of the color or shading of the stripes or markings. In another embodiment, a first stripe of the encoding pattern may cause specular reflection while a second stripe of the encoding pattern may cause diffuse reflection. When the reflected light is received by the photodiode array, a determination may be made as to the position and movement of the shaft such as described below. In embodiments where a holographic or diffractive pattern is used, the light from the light source will diffract from the shaft. Based on the diffracted light, the photodiode array may determine the position, movement and direction of movement of the shaft.

In embodiments, the stripes of the encoding pattern 165 extend axially along the shaft 160. The stripes may extend along the entire length of the shaft 160 or partially along a length of the shaft. In addition, the encoding pattern 165 may also be disposed around the entire circumference of the shaft 160. In other embodiments, the encoding pattern may include a radial component. In yet other embodiments, the encoding pattern may have both a radial component and an axial component.

In another embodiment, the encoding pattern 165 may be disposed only on certain areas of the shaft 160. For example, if a shaft 160 was configured to have partial rotational movement about an axis in a given direction (instead of full rotational movement about the axis such as described herein), the encoding pattern 165 may only be disposed on a portion of the shaft 160 that would be visible to the photodiode array 180 as the shaft 160 is rotated.

The light and dark stripes of the encoding pattern 165 may alternate between a light stripe and a dark stripe. In another embodiment, the light stripes and the dark stripes of the encoding pattern 165 may be arranged in a particular pattern or order. In such embodiments, each section of the pattern may indicate a position of the shaft 160.

Figure 2:
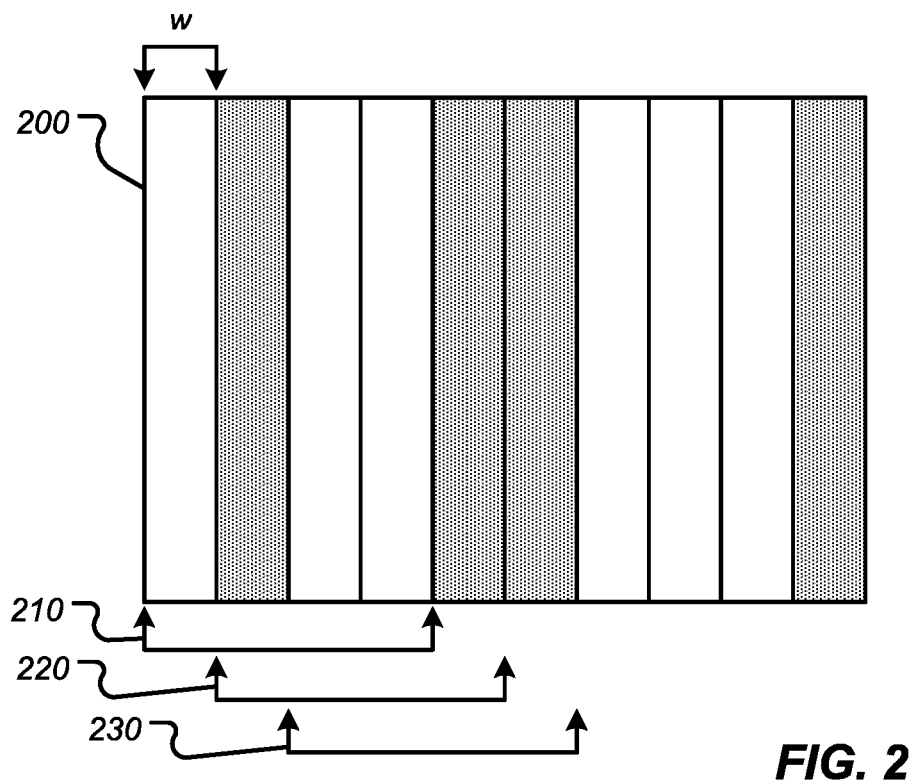
FIG. 2 illustrates an exemplary encoding pattern of an optical encoder according to embodiments of the present disclosure.

For example, as shown in FIG. 2, the stripes of an exemplary encoding pattern 200 disposed on a shaft of an optical encoder may be arranged as follows: light, dark, light, light, dark, dark, light, light, light, dark. Further, four stripes in combination may represent a four bit pattern that is associated with a position of the shaft.

Specifically, in the example shown in FIG. 2, the pattern 210 consists of stripes in the following order: light, dark, light, light. Likewise, the pattern 220 consists of stripes in the following order: dark, light, light, dark. Further, the pattern 230 consists of the following stripes: light, light, dark, dark and so on. Because there are no repeating patterns in the encoding pattern 200, each pattern (e.g., patterns 210, 220 and 230) would indicate a rotational position of the shaft of the encoder. As such, as the photodiode array detects the change in the pattern, movement of the shaft, including the direction of the movement and the speed of the movement, may be determined.

For example, if the photodiode array determines that pattern 220 is viewable at a first time and subsequently views pattern 210, a determination may be made that the shaft is moving in a counter-clockwise direction. Likewise, if the photodiode array determines that pattern 220 is viewable at a first time and subsequently views pattern 230, a determination may be made that the shaft is moving in a clockwise direction.

Although FIG. 2 illustrates an encoding pattern 200 in which the stripes themselves are arranged in a particular order, the stripes of the encoding pattern may alternate between a light stripe and a dark stripe. In other embodiments, the shading or color of each stripe may vary.

As also shown in FIG. 2, each stripe of the encoding pattern 200 may have a width w. In some embodiments, the width w of each of the stripes on the encoding pattern 200 may be uniform or substantially uniform. Accordingly, in embodiments where the stripes are arranged as alternating light and dark stripes, the uniformity of the stripes of the encoding pattern 200 may enable a measurement of rotation of the shaft.

In another embodiment, the stripes may indicate a starting position of a shaft of an encoder. As the shaft rotates, a number of revolutions of the shaft may be calculated and stored by the computing device 100 to determine a new rotational position of the shaft.

In another embodiment, the width w of each stripe of the encoding pattern 200 may vary. For example, each of the light stripes of the encoding pattern 200 may have a first width while each of the dark markings of the encoding pattern 200 may have a second, different width. In another example, a first stripe of the encoding pattern 200 may have a first width, a second stripe of the encoding pattern 200 may have a second width, and a third stripe of the encoding pattern 200 may have a third width. Such an arrangement may enable a computing device, such as, for example, computing device 100 to measure a position of the shaft based on the various widths of the stripes. The variable width of each of the stripes may be used in any of the encoding patterns discussed herein. For example, stripes having variable widths may be used in encoding patterns in which the order of the stripes vary, such as shown in FIG. 2, or in embodiments where the stripes of the encoding pattern alternate between light and dark stripes.

In another example, the varying widths of the stripe may provide a pattern that indicates a position of the shaft 160. For example, a stripe having a first width may indicate that the shaft 160 is in a first position while a stripe having a second width may indicate the shaft 160 is in a second position. In still yet another example, the different widths of each of the strips may be used to determine linear movement of the shaft 160 as well as rotational movement of the shaft 160.

The stripes of the encoding pattern 200 may also be arranged in different patterns. For example, the stripes of the encoding pattern 200 may arranged in a QR code, a bar code or other such pattern that may be used to determine a rotational, translational, or angular movement of the shaft 160 as well as the movement speed of the shaft 160.

Referring back to FIG. 1, the optical encoder of the present disclosure also includes a photodiode array 180. The photodiode array 180 is configured to receive light that is reflected off of the shaft 160. Specifically, the photodiode array 180 is configured to receive light of different intensity values based on whether the light has been reflected off of the encoding pattern and in a direction toward to photodiode array in a diffusive manner, in a specular manner or a combination thereof.

For example, the photodiode array 180 may receive light that is reflected off of the encoding pattern 165. Specifically, as light from the light source 170 hits the various stripes of the encoding pattern 165, the light is reflected off of the light stripes in a specular manner and is reflected off of the dark stripes in a diffusive manner. The various intensities of the reflected light is then received by the photodiode array 180 which then converts the reflected light into an output current.

Thus, the higher the output current from the photodiode, the more the light stripe, or the reflective stripe, is seen by the photodiode array 180 (or seen by a particular photodiode of the photodiode array 180). Likewise, the smaller the output current, the more the dark stripe, or non-reflective surface, is seen by the photodiode array 180 (or seen by a particular photodiode of the photodiode array 180).

Based on the above, rotational information of the shaft 160, and ultimately the crown 140 may be determined. For example, rotational data may be derived from analyzing the outputs of the photodiodes in the photodiode array 180 across various sample frames. The variance of the outputs in a given time between the sample frames is related to the motion or rotational direction of the stripes of the encoding pattern 165 and ultimately the shaft 160.

Figure 3A:
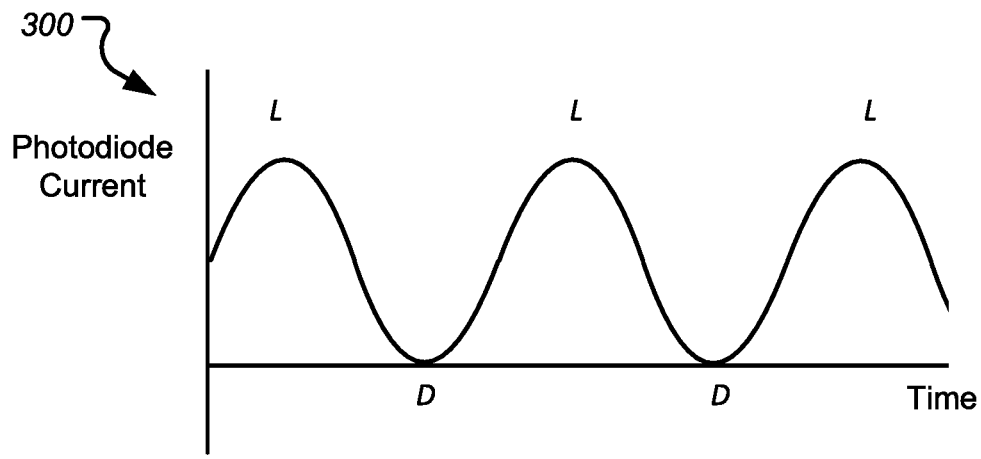
FIGS. 3A-3C illustrate exemplary current output graphs of a photodiode array according to embodiments of the present disclosure.
Figure 3B:
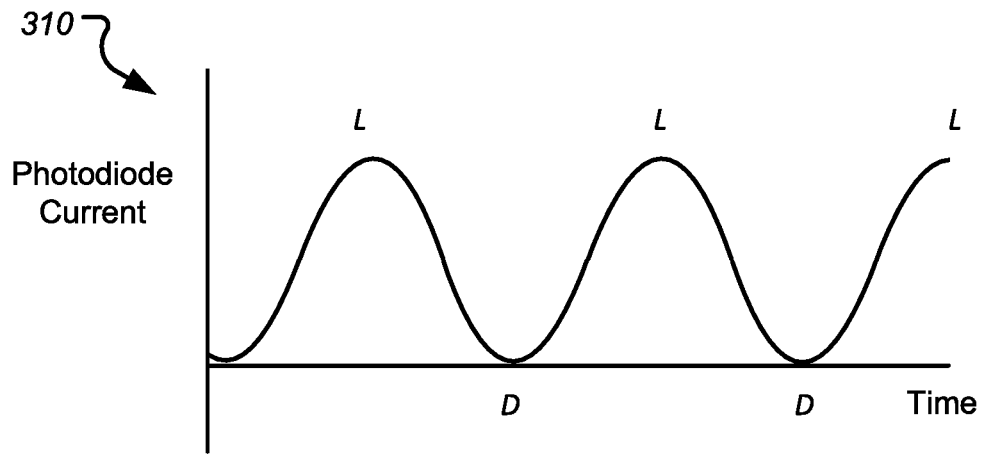
Figure 3C:
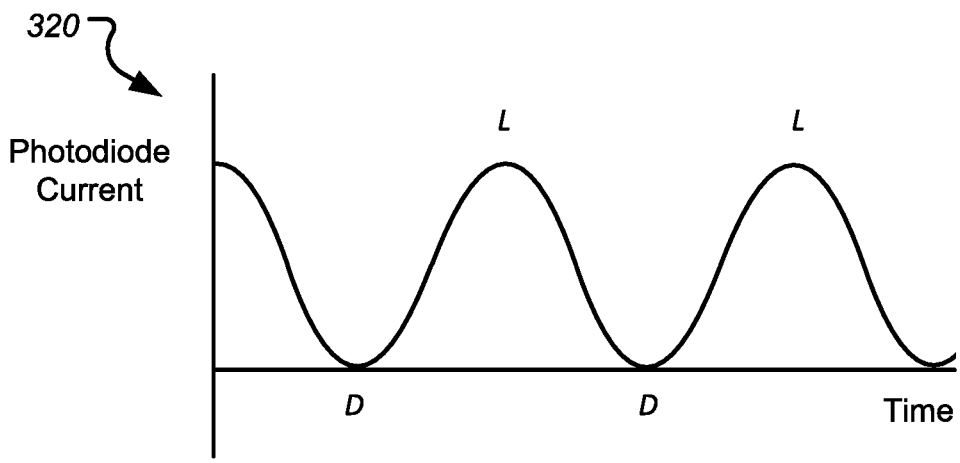

Referring to FIGS. 3A-3C, FIGS. 3A-3C show exemplary current output graphs provided by a photodiode array. For example, each graph 300, 310, and 320 represent output provided by a photodiode array as it receives light that is reflected off of an encoding pattern. As discussed above, the sensor that is used to detect movement of the shaft of the optical encoder may be any type of sensor. Thus, the outputs shown in FIGS. 3A-3C are but one example of output provided by a sensor.

For example, the graph 300 shown in FIG. 3A may represent output of a photodiode array over a time t. In a subsequent time period, the output of the photodiode array may look like the output provided by graph 310 of FIG. 3B. When compared with the output of the graph 300 of FIG. 3A, it can be determined that the shaft of the encoder is rotating in a particular direction, such as, for example a clockwise direction. Similarly, when the output of graph 320 shown in FIG. 3C is compared with the output of graph 300, it can be determined that the shaft of the encoder is rotating in another direction such as, for example, a counter-clockwise rotation. More specifically, as the photodiodes in the photodiode array take multiple sequential samples and compare the samples with at least one previous sample, rotational direction is able to be determined based on the current output of the photodiode array.

In addition to the rotational information, the current output from the photodiode array may be used to determine a speed at which the shaft is rotating. In embodiments, the speed of the rotation of the shaft is determined based on how quickly the pattern of reflected light changes. Once the rotational direction and speed are determined, output on the display 120 may be adjusted accordingly. In addition, the output provided by the photodiode array may be used to detect the angular rotation of the shaft in a similar manner.

Although the examples above have been given with respect to rotational movement, the embodiments described herein may also be used to detect linear or translational movement of the shaft 160. For example, a user may push the crown 140 toward the housing 110 or pull the crown 140 away from the housing 110. In such embodiments, the light that is reflected off of the encoding pattern 165 and received by the photodiode array 180 may be used to determine the above-described translational movement of the shaft 160.

Referring back to FIG. 1B, the light source 170 of the electronic device 100 may be any type of emitter that provides a light that can be reflected off of the shaft 160 to be received by the photodiode array 180. For example, the light source 170 may be an LED, an infrared light such as, for example an infrared LED, a laser diode, a light bulb and the like.

In embodiments when the light source 170 is an infrared light source, the encoding pattern 165 disposed on the shaft 160 may be invisible to the human eye but the overall movement determination may operate as described above. For example, a first set of stripes of the encoding pattern 165 may be IR-absorptive and a second set of stripes of the encoding pattern 165 may be IR-reflective. The photodiode array may receive the IR-reflective light when the IR-reflective stripe is shown and less light as the shaft turns. Accordingly, a determination of rotational movement may be made as described above.

In embodiments, the light source 170 and the photodiode 180 are axially aligned with respect to the shaft 160. In another embodiment, the light source 170 and the photodiode 180 may be radially aligned with respect to the shaft 160. Although specific alignments are disclosed, in certain embodiments the light source 170 and the photodiode array 180 may be aligned with the shaft 160 in any suitable manner so long as light is emitted from the light source 170 is reflected off of the encoding pattern 165 on the shaft 160 and received by the photodiode array 180.

Depending on the use of the shaft 160, the length of the shaft 160 may vary between embodiments. For example, in some embodiments, the length of the shaft 160 may extend along a length or width of the housing 110. In another embodiment, the shaft 160 may have a length that is substantially less than a length or width of the housing 110.

In addition to the above, the distance in a z direction between the shaft 160 and the light source 170 and the photodiode array 180 may also vary. Generally, it should be noted that, as the z distance between the shaft 160 and the light source 170 and the photodiode 180 increases, the pattern of light reflected off of the shaft 160 increases in size. Specifically, the number of samples in a given time frame decreases. Likewise, as the z distance between the shaft 160 and the light source 170 and the photodiode array 180 decreases, the pattern of light reflected off of the shaft 160 decreases in size. More specifically, the number of samples in a given time frame increases. As the number of samples increase, the rotational direction and the rotation speed of the shaft may be better determined.

Figure 4A:
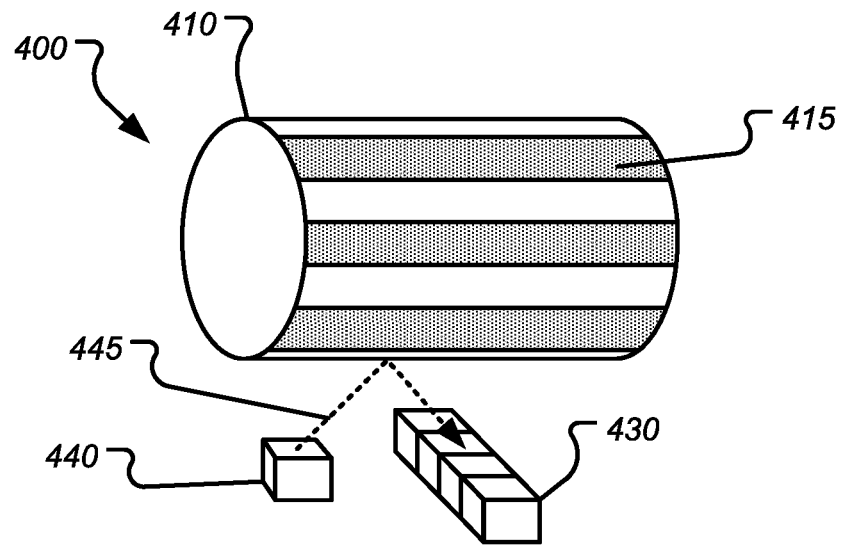
FIGS. 4A-4B illustrate an optical encoder having components of an optical sensor axially aligned with respect to the shaft of the optical encoder according to one or more embodiments of the present disclosure.
Figure 4B:
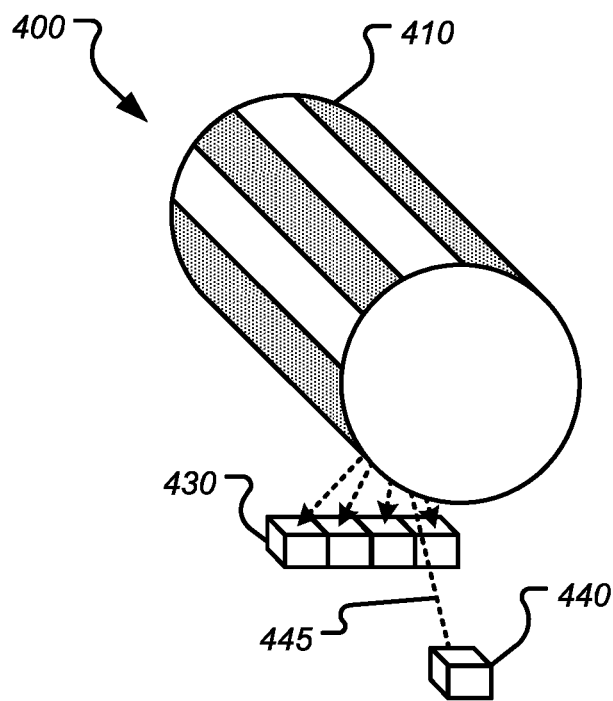

FIGS. 4A-4B illustrate an optical encoder 400 having components of an optical sensor axially aligned with respect to the shaft 410 of the optical encoder 400 according to one or more embodiments of the present disclosure. In embodiments, the optical encoder 400 may be similar to the optical encoder shown and described with respect to FIG. 1A and FIG. 1B.

As shown in FIG. 4A, the optical encoder 400 includes a shaft 410, a light source 440 and a photodiode array 430. The shaft 410 includes an encoding pattern 415. The encoding pattern 415 may include a plurality of different colored stripes or shaded stripes. For example, a first stripe of the encoding pattern may be in a first color, a second stripe of the encoding pattern may be in a second color and a third stripe of the encoding pattern 415 may be in a third color. As different colors may be used, the photodiode array 550 may be color-sensitive. Accordingly the change in color in the encoding pattern 515 as the shaft rotates about it axis may be used to determine rotational movement and speed of the shaft 510.

In addition, the stripes of the encoding pattern 415 are axially aligned with respect to the shaft 410. In addition, the stripes of the encoding pattern are arranged circumferentially around the shaft 410.

In certain embodiments, the stripes of the encoding pattern 415 may be configured to cause specular reflection and diffuse reflection. For example, as shown in FIG. 4A, the light 445 from the light source 440 may be reflected in a specular manner from the shaft to the photodiode array 430. In the example shown in FIG. 4B, the light 445 from the light source is diffusively reflected from the shaft 410 to the photodiode array 430.

Although embodiments shown and described discuss the use of both light and dark stripes in the encoding pattern, in certain embodiments, the entire shaft 410 may be specular (e.g., the entire shaft 410 enables specular reflection). In such embodiments, the shaft 410 may have one or more striations, flutes, channels and the like.

Figure 7:
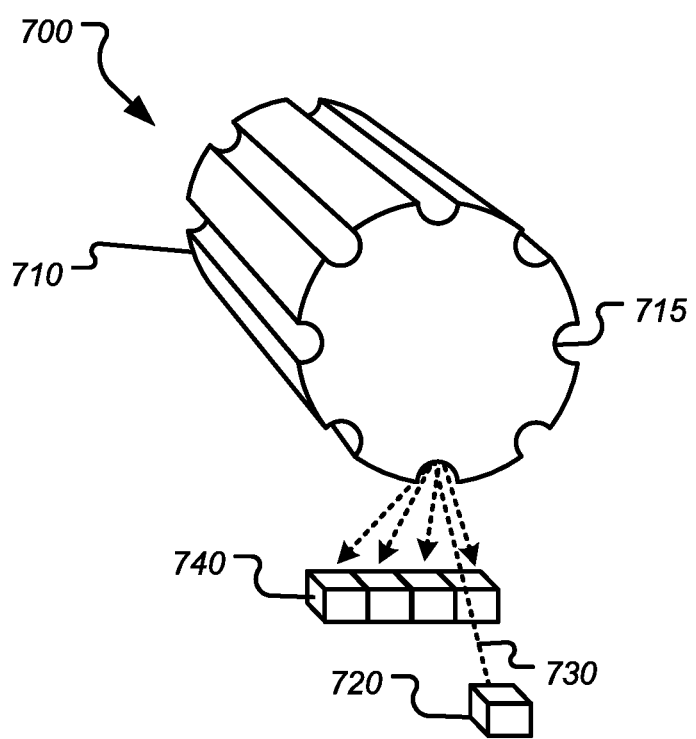
FIG. 7 illustrates an optical encoder having a plurality of surface structures according to one or more embodiments of the present disclosure.

For example, as shown in FIG. 7, a shaft 710 of an optical encoder 700 may include a plurality of surface forms 715, such as, for example one or more flutes, channels and the like. The surface forms 715 may be axially aligned with respect to the shaft 710, radially aligned with respect to the shaft 710 or a combination thereof. These surface forms may cause light to be reflected from the shaft 710 even if there is no variation in color or reflectance from the shaft 710. In embodiments, the surface forms 715 may be added to the shaft 710 during the manufacturing process or may be a natural byproduct (or otherwise present) in the shaft 710 due to a machining process.

In embodiments where the surface forms 715 are present, the shape of the one or more surface forms 715 in the shaft 710 may cause the light 730 from a light source 720 to be reflected from the shaft 710 in many different angles and be received by a photodiode array 740, thereby undergoing diffuse reflection. In such embodiments, the surface forms may vary in size or have the same or substantially the same size. In other embodiments, the shaft 710 may include surface forms 715 as well as one or more light and/or dark stripes of an encoding pattern such as described above. As such, both features may then be used in conjunction to determine rotational and/or linear movement and speed such as described above.

Referring back to FIG. 4A, the optical encoder 400 may include a light source 440 and a photodiode array 430. In embodiments, the light source 440 is axially aligned with the photodiode array 430 as a whole. Further, the light source 440 is axially aligned with an axis of rotation of the shaft 410.

Figure 5A:
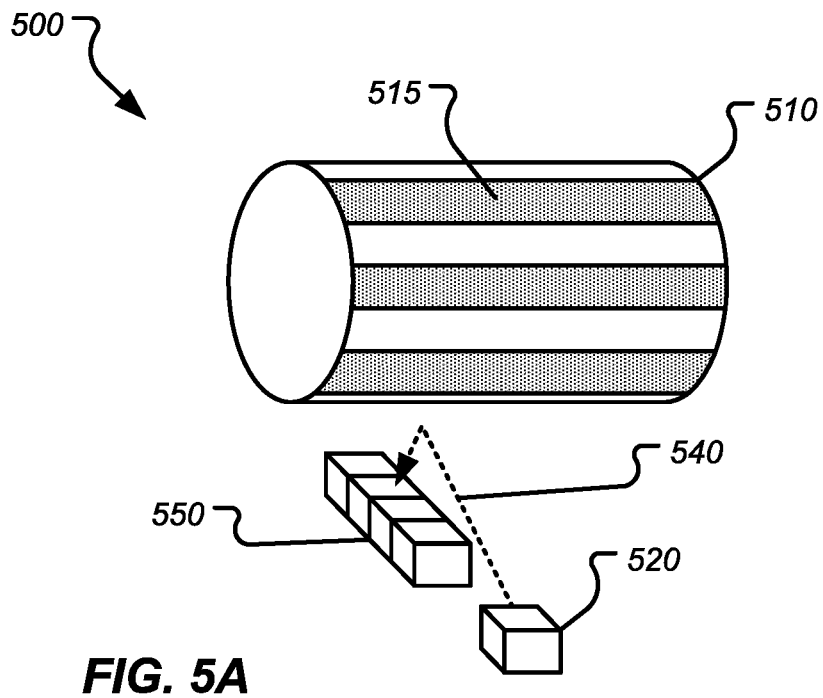
FIGS. 5A-5B illustrate an optical encoder having components of an optical sensor radially aligned with respect to the shaft of the optical encoder according to one or more embodiments of the present disclosure.
Figure 5B:
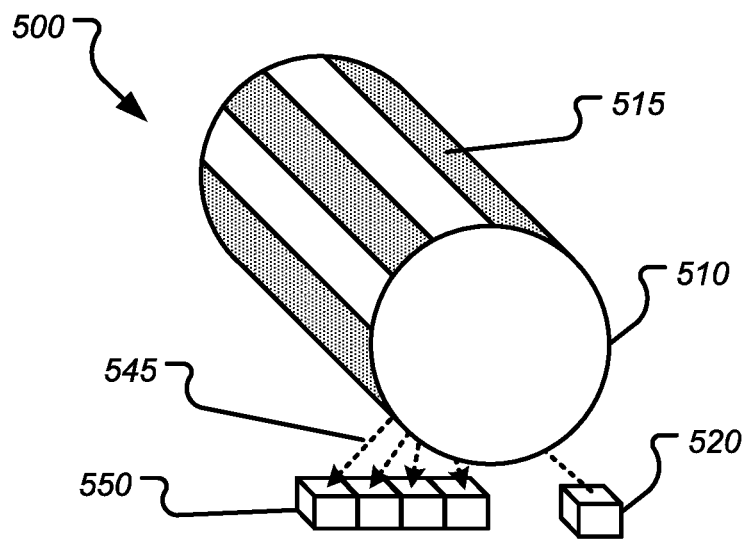

Axial alignment of the light source 440 and photodiode array 430 in the manner specified may require that the shaft 410 be longer than the embodiments shown and described in FIG. 5A and FIG. 5B to enable the light from the light source to be reflected off the shaft 410 and received by the photodiode array 430. Although the length of the shaft may be increased, axial alignment of the light source 440 and the photodiode array 430 may enable more accurate rotation data to be received as the light 445 is reflected off of the shaft 410 and collected by the photodiode array 430.

Although four photodiodes are specifically shown and described in the photodiode array 430, any number of photodiodes may be used. The number of photodiodes may increase or decrease depending on the size of the collection area of each of the photodiodes. For example, an accurate rotational or linear movement of the shaft 410 may be collected from an array of two photodiodes. In other embodiments, eight or more photodiodes may be required. In another embodiment, multiple arrays of photodiodes may be used. Further, each of photodiode arrays may be arranged in various alignments and positions with respect to the shaft 410.

FIGS. 5A-5B illustrate an optical encoder 500 having components of an optical sensor radially aligned with respect to the shaft 510 of the optical encoder according to one or more embodiments of the present disclosure. In embodiments, the optical encoder 500 may be similar to the optical encoder 100 shown and described with respect to FIG. 1A and FIG. 1B.

As shown in FIG. 5A, the optical encoder 500 includes a shaft 510, a light source 520 and a photodiode array 550. The shaft 510 includes an encoding pattern 515. The encoding pattern 515 may include a plurality of different colored stripes or shaded stripes. For example, a first stripe of the encoding pattern may be in a first color, a second stripe of the encoding pattern may be in a second color and a third stripe of the encoding pattern 515 may be in a third color. As different colors may be used, the photodiode array 550 may be color-sensitive. Accordingly the change in color in the encoding pattern 515 as the shaft rotates about it axis may be used to determine rotational movement and speed of the shaft 510.

Referring back to FIG. 5A, in certain embodiments, the stripes of the encoding pattern 515 are axially aligned with respect to the shaft 510. In addition, the markings of the encoding pattern 515 are arranged around a circumference of the shaft 510.

As discussed above, the markings of the encoding pattern 515 may be configured to cause specular reflection and diffuse reflection. For example, as shown in FIG. 5A, the light 540 from the light source 520 may be reflected in a specular manner from the shaft to the photodiode array 550. In the example shown in FIG. 5B, the light 545 from the light source 520 is diffusively reflected from the shaft 510 to the photodiode 550.

In certain embodiments, the entire shaft 510 may be coated with a coating or a marking that enables specular reflection. In such embodiments, the shaft 510 may have one or more surface structures such as shown and described with respect to FIG. 7.

As also shown in FIG. 5A, the optical encoder 500 may include a light source 520 and a photodiode array 550. In embodiments, the light source 520 and the photodiode array 550 are radially aligned with respect to the shaft 510. The radial alignment of the light source 520 and photodiode array 540 may enable the shaft 510 to be shorter than the embodiments shown in FIG. 4A and FIG. 4B.

Figure 6:
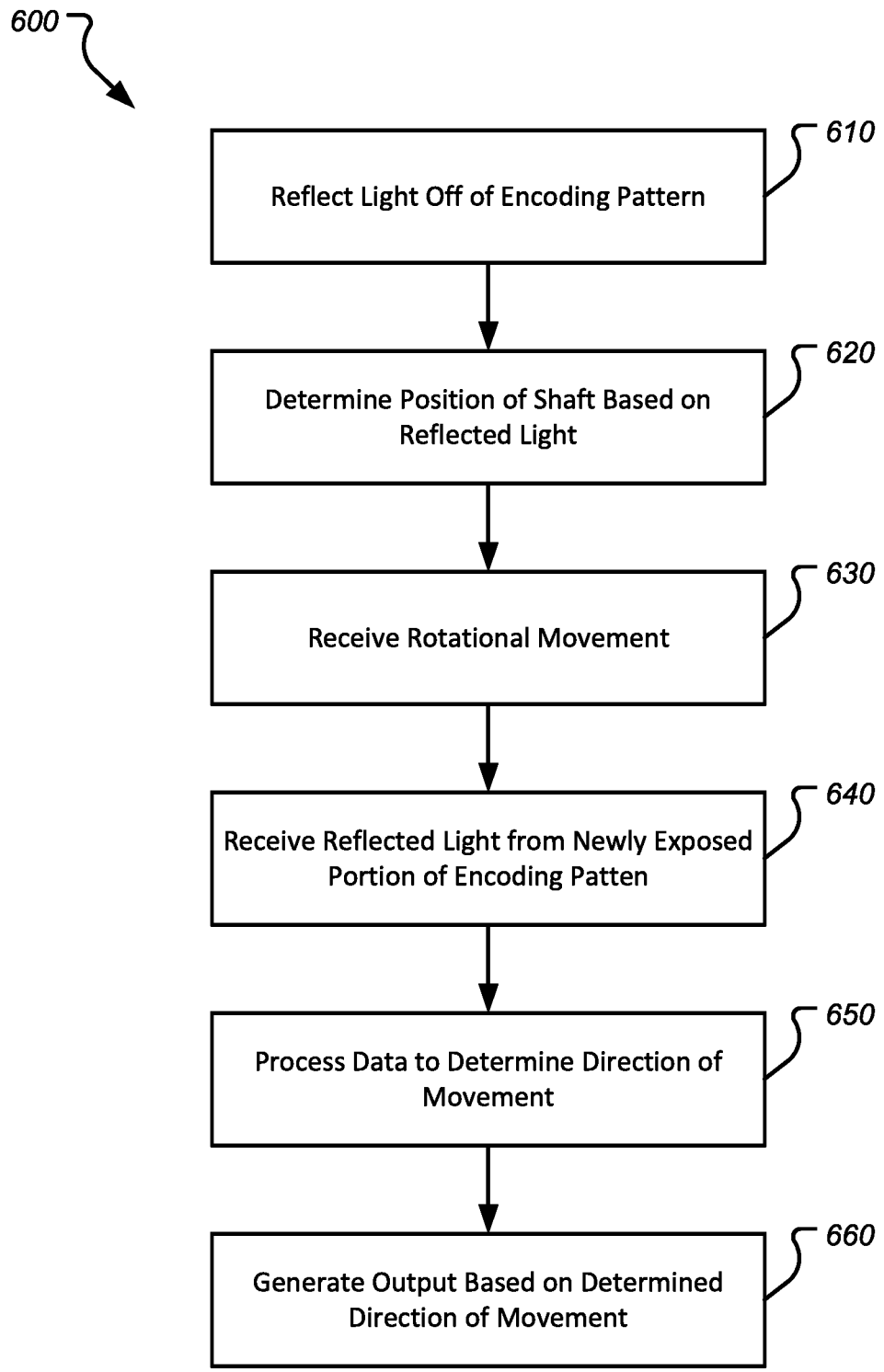
FIG. 6 illustrates a method for detecting movement of a component of an electronic device according to one or more embodiments of the present disclosure.

In embodiments and as shown in FIG. 5A and FIG. 5B, the photodiode array 550 may include four photodiodes. Although four photodiodes are specifically shown and described, any number of photodiodes may be used for the array 550. For example, the number of photodiodes may increase or decrease depending on the size of the collection area of each of the photodiodes such as described above FIG. 6 illustrates a method 600 for collecting and determining movement of a shaft of an optical encoder according to one or more embodiments of the present disclosure. In embodiments, the method 600 may be used to determine rotational movement of the shaft, angular movement of the shaft, translational movement of the shaft as well as a speed of movement of the shaft. Further, the method 600 described below may be used with the embodiments shown and described above with respect to FIG. 1A through FIG. 5B.

The method 600 begins by causing light from a light source to be reflected off of an encoding pattern that is disposed on a shaft of an optical encoder. The encoding pattern disposed on the shaft may include a plurality of light and dark stripes that are axially disposed along a length of the shaft of the optical encoder such as described above.

In another embodiment, the shaft of the optical encoder may include one or more surface components such as shown in FIG. 7. In such embodiments, the surface components may be used to reflect light in a variety of different directions. The surface components may be used in conjunction with the light and dark markings of the encoding pattern. In alternative embodiments, the surface components may be used without the need of either one or both of the light markings of the encoding pattern or the dark markings of the encoding pattern.

In operation 620, the light that is reflected off of the encoding pattern is received by a photodiode array. As discussed above, both the light source and the photodiode array may be axially aligned with the shaft. In another embodiment, both the light source and the photodiode array are radially aligned with respect to the shaft. Although axial alignment and radial alignment are specifically mentioned, other alignments may be used.

When the photodiode array receives the reflected light, an initial position of the shaft may be determined. Specifically, as light is reflected from the encoding pattern and received by the photodiode array, the photodiode array outputs a current which represents the amount of light and dark stripes that are in view of the photodiode array. This output current may then be used to represent a position of the shaft at a time t.

Flow then proceeds to operation 630 in which movement of the shaft is received. In embodiment, the movement may be rotational movement, translational movement, angular movement or combinations thereof. For example a crown of an electronic device may be rotated to change an output on a display such as described above. In another embodiment, the crown may be pushed inward or pulled outward.

Flow then proceeds to operation 640 in which light from the newly exposed portion of the encoding pattern is received by the array of photodiodes. When the newly reflected light is received, the photodiode array outputs a current based on the intensity of the reflected light.

Once the reflected light from the newly exposed encoding pattern is received, operation 650 provides that the data output by the photodiode array is analyzed to determine a direction of movement of the shaft. In embodiments, the speed of the movement of the shaft may also be determined.

Specifically, operation 650 provides that data output by the photodiode array from operation 620 above may be compared against data output by the photodiode array from operation 640. For example, light intensity received by the photodiode array at a first time is compared against light intensity received by the photodiode at a second time. If the light intensity at the second time is greater than the light intensity at the first time, the shaft may be rotating in a counter-clockwise direction. Likewise, if the light intensity at the second time is less than light intensity at a first time, the shaft may be rotating in a clockwise rotation. Although the example above specifies that two samples are compared to determine movement of the shaft, operation 650 may use any number of samples, sequential or otherwise, to determine a directional movement of the shaft of the encoder.

Further, operation 650 may be used to determine a speed of rotation of the shaft. For example, as the photodiode array outputs the detected change in current, the speed of the change may also be monitored. The change in speed may then be used to determine the overall speed of the movement of the shaft.

In operation 660, output is generated based on the determined direction of the movement of the shaft. For example, as a crown of an electronic device is rotated or otherwise moves, one or more icons or images a display of the electronic device may need to be updated accordingly. For example, if the display of the electronic device is displaying a time keeping application, the crown of the electronic device may be rotated in either direction to change or adjust the position of the hands that are displayed by the time keeping application. Specifically, the hands that are displayed by the time keeping application may move in the direction and speed indicated by the determined movement and speed of the shaft such as described above.

Although embodiments have been described above with respect to a rotational and translational movement of a shaft of an electronic device, embodiments of the present disclosure are not so limited. For example, the crown of the electronic device shown with respect to FIG. 1A could be replaced by a keycap for a keyboard. Thus, each key of the keyboard may be optically encoded for translational movement or other types of movement. In other embodiments, the optical encoder disclosed herein could be used with a button a sliding switch and the like.

Embodiments of the present disclosure are described above with reference to block diagrams and operational illustrations of methods and the like. The operations described may occur out of the order as shown in any of the figures. Additionally, one or more operations may be removed or executed substantially concurrently. For example, two blocks shown in succession may be executed substantially concurrently. Additionally, the blocks may be executed in the reverse order.

The description and illustration of one or more embodiments provided in this disclosure are not intended to limit or restrict the scope of the present disclosure as claimed. The embodiments, examples, and details provided in this disclosure are considered sufficient to convey possession and enable others to make and use the best mode of the claimed embodiments. Additionally, the claimed embodiments should not be construed as being limited to any embodiment, example, or detail provided above. Regardless of whether shown and described in combination or separately, the various features, including structural features and methodological features, are intended to be selectively included or omitted to produce an embodiment with a particular set of features. Having been provided with the description and illustration of the present application, one skilled in the art may envision variations, modifications, and alternate embodiments falling within the spirit of the broader aspects of the embodiments described herein that do not depart from the broader scope of the claimed embodiments.

We claim:

1. An optical encoder for an electronic device, the optical encoder comprising:
   a processor;
   an elongated shaft;
   a plurality of rotationally asymmetric surface forms of different sizes disposed around a circumference of the elongated shaft; and
   an optical sensor comprising a light emitter and a plurality of photodiodes;
   wherein:
   the optical sensor is axially aligned with respect to the elongated shaft;
   the plurality of photodiodes are configured to receive light emitted from the light emitter and reflected from the surface forms;
   the processor is communicatively linked with the plurality of photodiodes; and
   the processor is configured to determine a rotation of the elongated shaft using an output of the plurality of photodiodes.

2. The optical encoder of claim 1, wherein the plurality of photodiodes is configured in an array that has a dimension that is aligned radially with respect to the elongated shaft.

3. The optical encoder of claim 2, wherein the surface forms reflect the emitted light at least partially along the dimension of the array of photodiodes that is radially aligned.

4. The optical encoder of claim 1, wherein the light emitter is a light emitting diode.

5. The optical encoder of claim 1, wherein the surface forms comprise channels in the elongated shaft.

6. The optical encoder of claim 1, wherein the surface forms form a diffraction pattern.

7. The optical encoder of claim 1, wherein the surface forms reflect light toward the plurality of photodetectors at different angles.

8. The optical encoder of claim 1, further comprising a crown, wherein the crown is coupled to the elongated shaft.

9. An electronic device comprising:
   a processor;
   a memory;
   an elongated shaft formed by a machining process and having a plurality of rotationally asymmetric surface forms of different sizes formed as a byproduct of the machining process and disposed around a circumference of the elongated shaft;
   a light emitter configured to direct light axially onto the elongated shaft; and
   a light sensor comprising a plurality of photodiodes positioned to receive light emitted from the light emitter that has been reflected from the surface forms;
   wherein:
   the light emitter and the light sensor are axially aligned with respect to the elongated shaft;
   the processor is communicatively linked with the light sensor and the memory;
   the elongated shaft is configured to rotate about its axis; and
   the processor is configured to determine a rotation of the elongated shaft based on a signal from the light sensor.

10. The electronic device of claim 9, further comprising a crown coupled to an end of the elongated shaft and extending at least partially from a housing of the electronic device.

11. The electronic device of claim 9, wherein the plurality of surface forms comprise axially oriented channels in the elongated shaft.

12. The electronic device of claim 9, wherein the surface forms reflect the light in a plurality of directions.

13. The electronic device of claim 12, wherein the reflected light has a diffraction pattern that is detected by the light sensor.

14. A method of detecting rotational movement of an elongated shaft contained within a housing of an electronic device, the method comprising:
   causing a light source to emit light onto the elongated shaft, wherein:
   the elongated shaft includes a plurality of rotationally asymmetric surface forms of different sizes disposed around a circumference of the elongated shaft;
   the emitted light is emitted axially with respect to the elongated shaft; and
   the surface forms cause the emitted light to reflect from the elongated shaft;
   receiving the reflected light at a plurality of photodiodes, the plurality of photodiodes and the light source being aligned axially with respect to the elongated shaft; and
   determining a direction of the rotational movement of the elongated shaft based on the reflected light.

15. The method of claim 14, wherein determining a direction of the rotational movement based on the reflected light comprises comparing an output current of the plurality of photodiodes at a first time period to an output current of the plurality of photodiodes at a second time period.

16. The method of claim 14, further comprising determining a speed of rotational movement of the elongated shaft based on the reflected light.

17. The method of claim 16, further comprising altering an operation of the electronic device based on at least one of the direction and the speed of the rotational movement of the elongated shaft.

18. The method of claim 14, further comprising a machining process to form the elongated shaft, wherein the plurality of surface forms are formed as a byproduct of the machining process.

19. The electronic device of claim 13, wherein:
   the elongated shaft has a first rotational position and a second rotational position;
   the reflected light has a first intensity at the first rotational position and a second intensity at the second rotational position; and
   the processor, via the light sensor, determines a direction of rotation of the elongated shaft by comparing the first intensity and the second intensity.

* * * * *